(12) United States Patent
Yoshinori et al.

(10) Patent No.: US 9,847,698 B2
(45) Date of Patent: Dec. 19, 2017

(54) ROTATING ELECTRIC MACHINE AND METHOD OF OPERATING THE SAME

(71) Applicant: Mitsubishi Electric Corporation, Tokyo (JP)

(72) Inventors: Manabu Yoshinori, Tokyo (JP); Masaki Horii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 165 days.

(21) Appl. No.: 14/620,851

(22) Filed: Feb. 12, 2015

(65) Prior Publication Data

US 2016/0099633 A1    Apr. 7, 2016

(30) Foreign Application Priority Data

Oct. 2, 2014    (JP) .................................. 2014-203608

(51) Int. Cl.
    *H02K 9/19*    (2006.01)
    *H02K 1/32*    (2006.01)
    *H02K 1/20*    (2006.01)

(52) U.S. Cl.
    CPC .................. *H02K 9/19* (2013.01); *H02K 1/32* (2013.01); *H02K 1/20* (2013.01)

(58) Field of Classification Search
    CPC ................................... H02K 1/32; H02K 9/19
    See application file for complete search history.

(56) References Cited

U.S. PATENT DOCUMENTS

| | | | | |
|---|---|---|---|---|
| 3,591,816 A | * | 7/1971 | Sakamoto | H02K 1/32 310/162 |
| 3,648,085 A | * | 3/1972 | Fujii | H02K 9/19 310/54 |
| 4,597,720 A | * | 7/1986 | Friedrichs | A47L 11/38 417/368 |

(Continued)

FOREIGN PATENT DOCUMENTS

| | | |
|---|---|---|
| JP | 2001238406 A | 8/2001 |
| JP | 2003102147 A | 4/2003 |

(Continued)

OTHER PUBLICATIONS

Communication dated Jun. 30, 2015 from the Japanese Patent Office issued in corresponding application No. 2014203608.

*Primary Examiner* — Dang Le
(74) *Attorney, Agent, or Firm* — Sughrue Mion, PLLC; Richard C. Turner (57) ABSTRACT

Provided is an electric motor having improved overall cooling efficiency by enabling a coolant to flow around a stator and around and through a rotor in parallel for the stator and the rotor to allow the stator and the rotor to be cooled in parallel. In the electric motor, after an automatic transmission fluid flowing into a first coolant inflow port (10) passes through a shaft internal flow path and rotor internal flow paths (27), the automatic transmission fluid passes through a coolant exhaust port (20) to flow out of a housing (18). After the automatic transmission fluid flowing into a second coolant inflow port (11) passes through a clearance (31) between the housing (18) and a stator (17) and around coil ends (29) of stator coils (16), the automatic transmission fluid passes through the coolant exhaust port (20) to flow out of the housing (18).

14 Claims, 4 Drawing Sheets

(56) References Cited

U.S. PATENT DOCUMENTS

| | | | | |
|---|---|---|---|---|
| 2007/0228847 A1* | 10/2007 | Kim | ................... | H02K 1/32 |
| | | | | 310/61 |
| 2010/0033040 A1* | 2/2010 | Wakita | ................ | H02K 11/25 |
| | | | | 310/54 |
| 2013/0334912 A1* | 12/2013 | Tokunaga | ............ | H02K 9/19 |
| | | | | 310/54 |
| 2014/0042841 A1* | 2/2014 | Rippel | ................ | H02K 1/20 |
| | | | | 310/54 |

FOREIGN PATENT DOCUMENTS

| | | | |
|---|---|---|---|
| JP | 2005198451 | A | 7/2005 |
| JP | 2006312353 | A | 11/2006 |
| JP | 2008263753 | A | 10/2008 |
| JP | 2009-195082 | A | 8/2009 |
| JP | 2010187490 | A | 8/2010 |
| JP | 2013-115848 | A | 6/2013 |
| JP | 2014110705 | A | 6/2014 |

* cited by examiner

ROTATING ELECTRIC MACHINE AND METHOD OF OPERATING THE SAME

BACKGROUND OF THE INVENTION

1. Field of the Invention

The present invention relates to a rotating electric machine to be cooled by a coolant flowing inside of the rotating electric machine, and to a method of operating the same.

2. Description of the Related Art

There is conventionally known a rotating electric machine in which a coolant supplied into a hollow shaft is scattered by rotation of the hollow shaft itself to cool coil ends of a stator (see, for example, Japanese Patent Application Laid-open No. 2013-115848).

The following rotating electric machine is also known. The rotating electric machine includes a ring member provided on an outer circumference of a stator core and a case which houses the stator core and the ring member therein. A coolant is supplied between the ring member and the case so that the coolant is supplied to coil ends of a stator through holes formed through the ring member (see, for example, Japanese Patent Application Laid-open No. 2009-195082).

The rotating electric machines described in Japanese Patent Application Laid-open Nos. 2013-115848 and 2009-195082 both have a structure in which the coil ends of the stator are cooled. Therefore, although the coil ends of the stator are cooled actively, the remaining portion of the stator and a rotor provided on the inner side of the stator are not cooled actively. Thus, the above-mentioned rotating electric machines have a problem in that cooling efficiency as a whole is low.

SUMMARY OF THE INVENTION

The present invention has been made to solve the problem described above, and therefore has an object to provide a rotating electric machine having improved cooling efficiency as a whole by enabling a coolant to flow around a stator and around and through a rotor in parallel for both the stator and the rotor to allow the stator and the rotor to be cooled in parallel.

Further, the present invention has another object to provide a method of operating the rotating electric machine, which is capable of efficiently cooling each of the stator and the rotor by changing a flow-rate allocation of the coolant flowing to the stator side and that of the coolant flowing to the rotor side based on physical quantities of internal states of the rotating electric machine.

According to one embodiment of the present invention, there is provided a rotating electric machine, including a rotating electric machine main body including:

a shaft;

a rotor fixed to the shaft;

a stator including a stator core and a stator coil, the stator surrounding an outer circumferential surface of the rotor; and a housing surrounding the stator and the rotor, in which:

the housing includes a first coolant inflow port and a second coolant inflow port for guiding a coolant into the housing and a coolant exhaust port for exhausting the coolant in the housing to outside;

the shaft includes a shaft internal flow path having an end surface opposed to the first coolant inflow port, for guiding the coolant into the shaft;

the rotor includes a rotor internal flow path being in communication with the shaft internal flow path and passing through the rotor in an axial direction of the rotor, for guiding the coolant flowing out of the shaft internal flow path to outside of the rotor;

the coolant flowing into the first coolant inflow port passes through the shaft internal flow path and the rotor internal flow path and then flows out of the housing through the coolant exhaust port; and the coolant flowing into the second coolant inflow port passes through a clearance between the housing and the stator and around coil ends of the stator coil and then flows out of the housing through the coolant exhaust port.

According to one embodiment of the present invention, there is provided a method of operating a rotating electric machine, including:

selecting at least one of physical quantities of internal states of an electric motor main body, including a temperature of the stator and the rotor, a number of revolutions of the rotor, and an output torque of the electric motor main body; and changing flow-rate allocations for an amount of automatic transmission fluid flowing to the rotor side and an amount of automatic transmission fluid flowing to the stator side based on the selected at least one physical quantity.

According to the rotary electric machine of one embodiment of the present invention, the stator and the rotor can be cooled in parallel by enabling the coolant to flow around the stator and around and through the rotor in parallel for both the stator and the rotor. As a result, the overall cooling efficiency can be improved.

Further, according to the method of operating the rotating electric machine of one embodiment of the present invention, the flow-rate allocation of the coolant flowing to the stator side and that of the coolant flowing to the rotor side are changed based on the physical quantities of the internal states of the rotating electric machine. As a result, a proper amount of the coolant is fed to each of the stator and the rotor. Hence, the stator and the rotor can be efficiently cooled, respectively.

DETAILED DESCRIPTION OF THE PREFERRED EMBODIMENTS

Now, an electric motor 1 according to each of embodiments of the present invention is described. In the drawings, the same or corresponding members and parts are denoted by the same reference symbols for description.

First Embodiment

Figure 1:
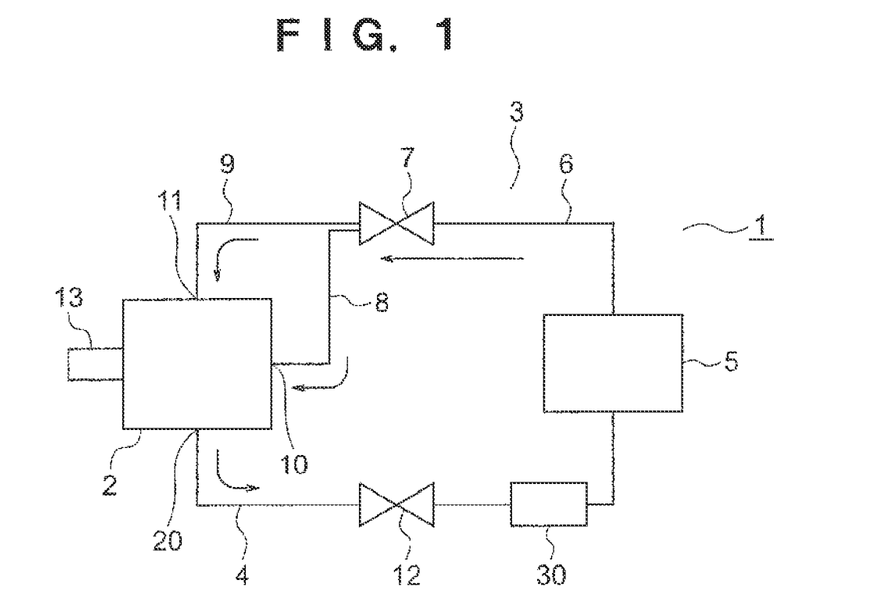
FIG. 1 is a coolant circuit diagram of an electric motor according to a first embodiment of the present invention.

FIG. 1 is a coolant circuit diagram of an electric motor 1 which is a rotating electric machine according to a first embodiment of the present invention.

The electric motor 1, which is to be mounted in an automobile, includes an electric motor main body 2 which is a rotating electric machine main body, a pump 5, an outgoing pipe 3, and a return pipe 4. The electric motor main body 2 and the pump 5 are connected to each other through the outgoing pipe 3 and the return pipe 4.

The outgoing pipe 3 includes a pipe main body 6. The pipe main body 6 has one end portion connected to the pump 5 and another end portion to which a three-way valve 7 is mounted. On a downstream side of the three-way valve 7, a first outgoing pipe portion 8 and a second outgoing pipe portion 9 branch from the pipe main body 6. A distal end portion of the first outgoing pipe portion 8 is connected to a first coolant inflow port 10 of the electric motor main body 2. A distal end portion of the second outgoing pipe portion 9 is connected to a second coolant inflow port 11 of the electric motor main body 2.

A two-way valve 12 and a cooling device 30 are mounted to a middle portion of the return pipe 4.

Figure 2:
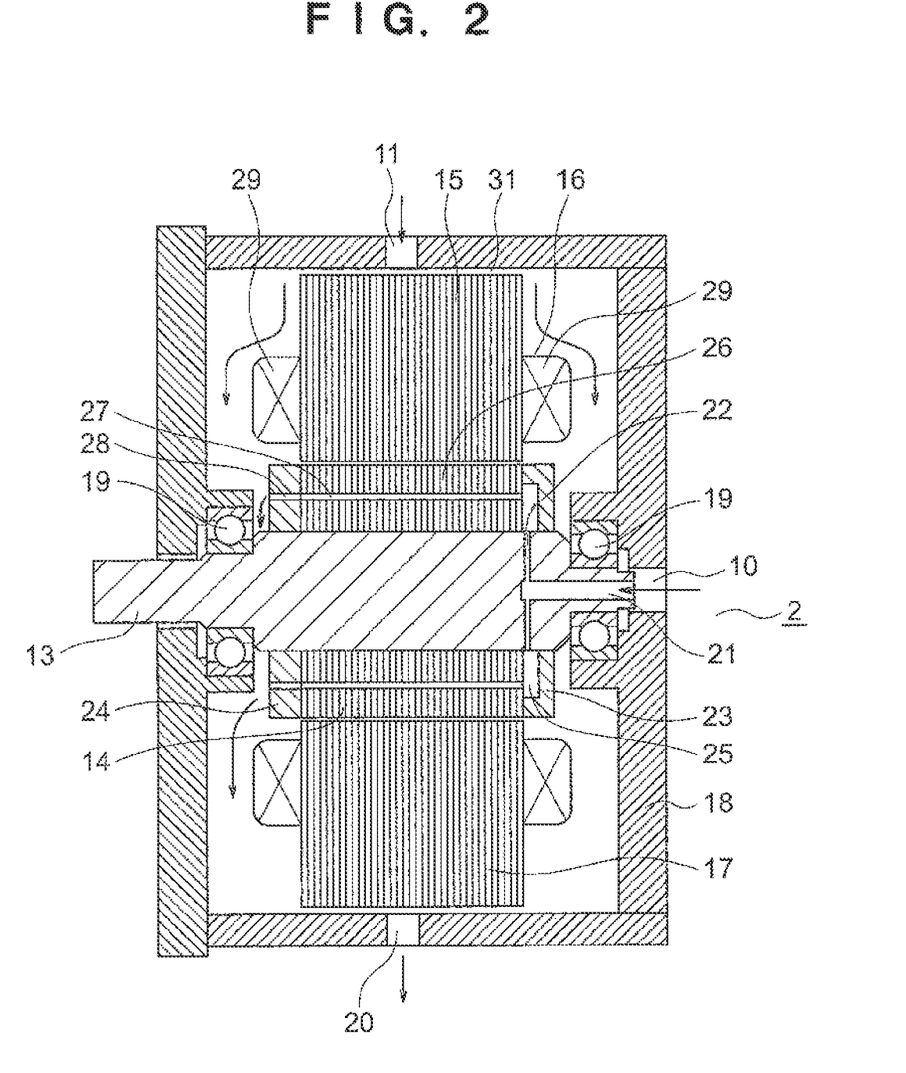
FIG. 2 is a front sectional view of an electric motor main body illustrated in FIG. 1.

FIG. 2 is a front sectional view illustrating the electric motor main body 2 illustrated in FIG. 1.

The electric motor main body 2 includes a shaft 13, a rotor 14, a stator 17, a housing 18, a first plate 23, and a second plate 24. The shaft 13 has one end portion connected to a speed reducer (not shown). The rotor 14 is fixed to the shaft 13. The stator 17 surrounds an outer circumferential surface of the rotor 14. The housing 18 surrounds the stator 17 and the rotor 14. The first plate 23 and the second plate 24 are provided on both sides of the rotor 14 in an axial direction of the shaft 13 so as to interpose the rotor 14 therebetween. A clearance 31 is formed between an inner circumferential wall surface of the housing 18 and an outer circumferential surface of a stator core 15.

The housing 18 has the first coolant inflow port 10 formed so as to be opposed to one end surface of the shaft 13 which is rotatably supported by bearings 19. The housing 18 also has the second coolant inflow port 11 formed in an upper portion thereof. The housing 18 has a coolant exhaust port 20 formed in a lower portion thereof.

An automatic transmission fluid, which is a coolant, flows into the housing 18 through the first coolant inflow port 10 and the second coolant inflow port 11 and flows out of the housing 18 through the coolant exhaust port 20.

The shaft 13 has a shaft internal flow path having one end surface opposed to the first coolant inflow port 10. The shaft internal flow path guides the automatic transmission fluid into the shaft 13.

The shaft internal flow path includes a first shaft internal flow path portion 21 and a plurality of second shaft internal flow path portions 22. The first shaft internal flow path portion 21 is formed along the axial direction of the shaft 13 and guides the automatic transmission fluid flowing from the first coolant inflow port 10 into the shaft 13. The plurality of second shaft internal flow path portions 22 are formed at equal intervals along a circumferential direction so as to extend from the first shaft internal flow path portion 21 in a radial direction of the shaft 13. A distal end surface of each of the second shaft internal flow path portions 22 is exposed to a reservoir portion 25. The reservoir portion 25 is a space portion which is formed on the inner side of the first plate 23 having a disc-like plate shape.

The rotor 14 includes a rotor core 26 and a plurality of permanent magnets (not shown). The rotor core 26 is fixed to the shaft 13 by press-fitting, shrinkage-fitting, or a key and is formed by laminating thin steel plates. The plurality of permanent magnets are embedded on the outer circumferential side of the rotor core 26 at intervals in the circumferential direction.

The rotor core 26 includes a plurality of rotor internal flow paths 27 passing therethrough in an axial direction thereof, which are formed equiangularly. A plurality of plate internal flow paths 28 are formed through the second plate 24 so as to be respectively coaxial with the rotor internal flow paths 27.

The stator 17 includes a stator core 15 and stator coils 16. The stator core 15 is formed by laminating thin steel plates.

The stator core 15 includes a plurality of slots (not shown) which are formed equiangularly so as to extend along an axial direction thereof.

The stator coils 16 have coil ends 29. A conductor is wound in the slots so that the coil ends 29 project outward in the axial direction from both end surfaces of the stator core 15.

In the electric motor main body 2 described above, a three-phase AC current is allowed to flow through the stator coils 16 to generate a rotating magnetic field in the stator 17. The rotating magnetic field attracts a group of the permanent magnets of the rotor 14. As a result, the rotor 14 rotates about the shaft 13.

By the driving of the electric motor main body 2, the stator 17 and the rotor 14 generate heat to increase a temperature. As a result, operating efficiency of the electric motor main body 2 is lowered.

In order to prevent the operating efficiency from being lowered, the stator 17 and the rotor 14 are cooled in parallel by the automatic transmission fluid which is the coolant.

In the electric motor 1 having the configuration described above, after passing through the pipe main body 6 and the three-way valve 7 as indicated by the arrows in FIGS. 1 and 2 by the driving of the pump 5, the flow of the automatic transmission fluid is split into a flow to the first outgoing pipe portion 8 and a flow to the second outgoing pipe portion 9. The automatic transmission fluid flowing through the first outgoing pipe portion 8 flows to the first coolant inflow port 10, the first shaft internal flow path portion 21, the second shaft internal flow path portions 22, and the reservoir portion 25.

Thereafter, after subsequently passing through the rotor internal flow paths 27, the plate internal flow paths 28, and an internal space portion of the housing 18, the automatic transmission fluid reaches the coolant exhaust port 20.

On the other hand, the automatic transmission fluid flowing through the second outgoing pipe portion 9 passes through the second coolant inflow port 11, the clearance 31 between the housing 18 and the stator core 15, and the periphery of the coil ends 29 and then reaches the coolant exhaust port 20.

Thereafter, after the flows of the automatic transmission fluid split by the three-way valve 7 are combined to pass through the coolant exhaust port 20, the return pipe 4, and the cooling device 30, the automatic transmission fluid returns to the pump 5.

In the above-mentioned manner, the automatic transmission fluid circulates through the pump 5 and the electric motor main body 2. The amount of heat generated by the rotor 14 and the stator 17 is actively released outside by the cooling device 3 through the automatic transmission fluid.

The amount of automatic transmission fluid flowing to the rotor 14 side through the first coolant inflow port 10 and the amount of automatic transmission fluid flowing to the stator 17 side through the second coolant inflow port 11 are adjusted by actuating the three-way valve 7 in accordance with physical quantities (a temperature, the number of revolutions, and a torque) of internal states of the electric motor main body 2.

In this case, among the physical quantities of the internal states of the electric motor main body 2, the temperature is a temperature of the stator 17 and the rotor 14, the number of revolutions is the number of revolutions of the rotor 14, and the torque is an output torque of the electric motor main body 2.

Figure 3:
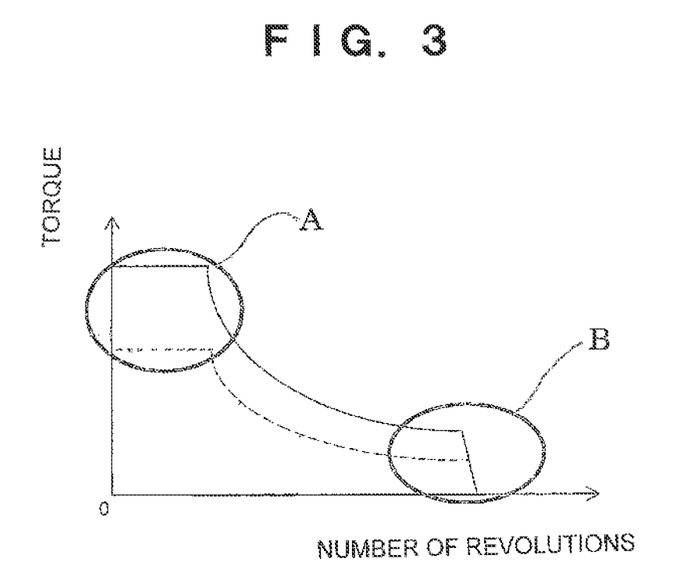
FIG. 3 is a relational graph showing a relationship between the number of revolutions of a rotor of the electric motor main body mounted in an automobile and a torque of the electric motor main body.

FIG. 3 is a relational graph showing a relationship between the number of revolutions of the rotor 14 and the torque of the electric motor main body 2 in the electric motor main body 2 mounted in the automobile. A solid line indicates a maximum torque, whereas a dotted line indicates a continuous rating torque.

In FIG. 3, a region A indicates the number of revolutions and the torque when the automobile is performing a staring operation or an uphill driving operation. In this case, the number of revolutions of the rotor 14 is small, whereas a load torque of the electric motor main body 2 is large.

When the number of revolutions of the rotor 14 is low and the load torque of the electric motor main body 2 is large, a large current flows through the stator coil 16 to increase the amount of heat generated by the stator 17 (copper loss). At this time, higher coolability is required for the stator 17 than for the rotor 14.

Therefore, in this case, the amount of automatic transmission fluid flowing into the first coolant inflow port 10 is reduced and the amount of automatic transmission fluid flowing into the second coolant inflow port 11 is increased by the actuation of the three-way valve 7 in the total amount of automatic transmission fluid flowing from the pump 5 through the pipe main body 6. In this manner, the coolability for the stator 17 can be enhanced as compared with that for the rotor 14.

In FIG. 3, a region B indicates the number of revolutions and the torque when the automobile is performing a cruising operation or a downhill accelerator-off driving operation. In this case, the number of revolutions of the rotor 14 is large, whereas a load torque of the electric motor main body 2 is small.

As described above, when the number of revolutions of the rotor 14 of the electric motor main body 2 is high, a frequency at which the rotor 14 interlinks with a rotating magnetic field from the stator 17 increases to increase a fluctuation in magnetic flux. As a result, an eddy current flows around the magnetic flux. Therefore, in the rotor 14, the amount of generated heat increases due to electric resistance generated by the eddy current (iron loss). Thus, in this case, higher coolability is required for the rotor 14 than that for the stator 17.

Therefore, in this case, in the total amount of automatic transmission fluid flowing from the pump 5 through the pipe main body 6, the amount of automatic transmission fluid flowing into the first coolant inflow port 10 is increased, whereas the amount of automatic transmission fluid flowing into the second coolant inflow port 11 is reduced by the actuation of the three-way valve 7. As a result, the coolability for the rotor 14 is enhanced as compared with that for the stator 17.

Further, in FIG. 3, in a region sandwiched between the region A and the region B, when an allowable upper limit temperature of the rotor 14 is X, a detected temperature of the rotor 14 is X1, an allowable upper limit temperature of the stator 17 is Y, and a detected temperature of the stator 17 is Y1, a value of X1/X and a value of Y1/Y are compared with each other. Then, the three-way valve 7 is actuated based on the result of comparison. In this manner, flow-rate allocations are determined so that a larger amount of automatic transmission fluid flows to any one of the rotor 14 and the stator 17, which has a larger value for the above-mentioned ratios.

During an operation in which the torque exceeds the continuous rating torque of the electric motor main body 2, a large current flows through the stator coils 16. In this case, the amount of heat generated from the stator 17 increases. Therefore, by actuating the three-way valve 7, a larger amount of automatic transmission fluid can be made to flow to the stator 17 side.

During a no-load rotation operation in which the number of revolutions of the rotor 14 of the electric motor main body 2 is so high that the current does not flow through the stator coils 16, power consumption can be reduced by stopping the pump 5.

A fan of the pump 5 rotates by inertia immediately after the pump 5 stops. Therefore, during the rotation of the fan by inertia, the automatic transmission fluid can be made to flow to the rotor 14 side and the stator 17 side.

During the no-load rotation operation in which the number of revolutions of the rotor 14 of the electric motor main body 2 is so high that the current does not flow through the stator coils 16, the pump 5 may be stopped and the three-way valve 7 may be closed.

In the above-mentioned manner, in the case where the pump 5 is a mechanical pump driven by an engine, to which power transmission cannot be interrupted, a mechanical loss can be eliminated to improve an output from the electric motor main body 2.

Second Embodiment

Figure 4:
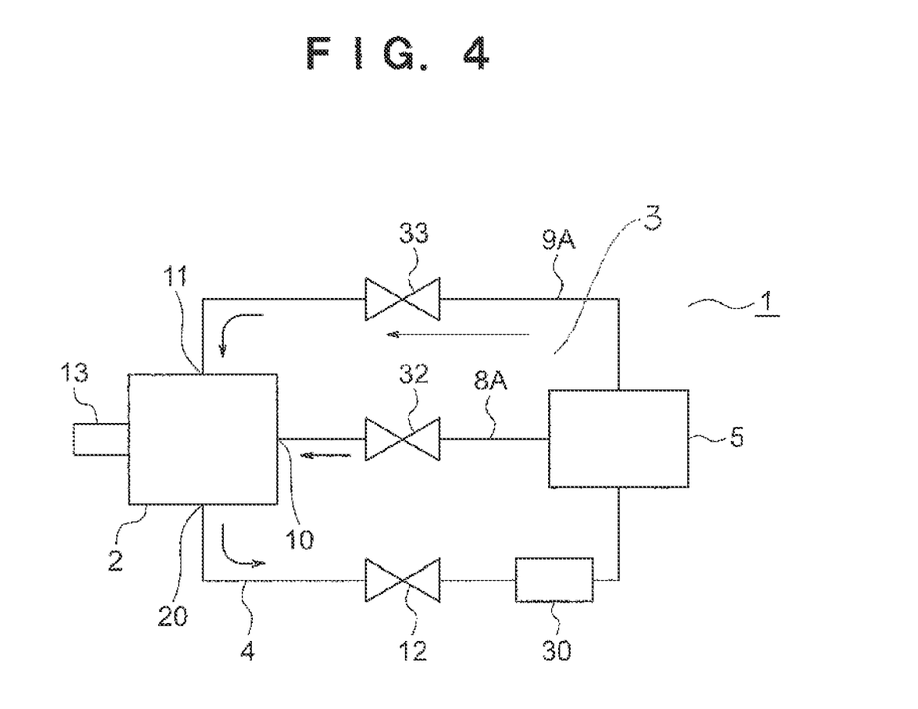
FIG. 4 is a coolant circuit diagram of an electric motor according to a second embodiment of the present invention.

FIG. 4 is a coolant circuit diagram of an electric motor 1 according to a second embodiment of the present invention.

In the second embodiment, the outgoing pipe 3 includes a first outgoing pipe portion 8A and a second outgoing pipe portion 9A. The first outgoing pipe portion 8A has one end portion connected to the pump 5 and another end portion connected to the first coolant inflow port 10 of the electric motor main body 2. The second outgoing pipe portion 9A has one end portion connected to the pump 5 and another end portion connected to the second coolant inflow port 11 of the electric motor main body 2.

A first two-way valve 32 is mounted to a middle portion of the first outgoing pipe portion 8A, whereas a second two-way valve 33 is mounted to a middle portion of the second outgoing pipe portion 9A.

The remaining configuration is the same as that of the electric motor 1 according to the first embodiment.

In the electric motor 1 according to the first embodiment, the amount of automatic transmission fluid flowing to the rotor 14 side and the amount of automatic transmission fluid flowing to the stator 17 side are changed by adjusting the three-way valve 7. Therefore, an increase/decrease in one of the amounts is closely correlated to that in the other amount. On the other hand, in the electric motor 1 according to the second embodiment, the amount of automatic transmission fluid flowing to the rotor 14 side is determined by the first two-way valve 32, whereas the amount of automatic transmission fluid flowing to the stator 17 side is determined by the second two-way valve 33. Thus, each of the amounts is adjusted independently.

In each of the embodiments described above, the flow-rate allocations for the amount of automatic transmission fluid flowing to the rotor 14 side and the amount of automatic transmission fluid flowing to the stator 17 side are changed based on the number of revolutions of the rotor 14 and the value of the output torque of the electric motor main body 2 in the regions A and B shown in FIG. 3 among the physical quantities of the internal states of the electric motor main body 2, specifically, the temperature of the stator 17 and the rotor 14, the number of revolutions of the rotor 14, and the output torque of the electric motor main body 2. In the region present between the regions A and B, the flow-rate allocations for the amount of automatic transmission fluid flowing to the rotor 14 side and the amount of automatic transmission fluid flowing to the stator 17 side are changed based on the temperature of the stator 17 and the rotor 14. The selection of the physical quantities for each case is merely an example.

The temperature of the stator 17 and the rotor 14, the number of revolutions of the rotor 14, and the output torque from the electric motor main body 2, which are the physical quantities of the internal states of the electric motor main body 2, change in accordance with operating conditions of the electric motor main body 2. At least one of the physical quantities is selected so that the flow-rate allocations for the amount of automatic transmission fluid flowing to the rotor 14 side and the amount of automatic transmission fluid flowing to the stator 17 side can be changed based on the selected physical quantity.

Further, although the electric motor 1 to be mounted in the automobile has been described as the rotating electric machine, the present invention is also applicable to an electric motor to be employed for other uses.

Further, the rotating electric machine may also be a power generator.

Further, although the automatic transmission fluid which is lubricant oil for automobiles has been described as the coolant, the coolant may also be a gas such as air for some uses.

Further, the use of the cooling device 30 may be omitted depending on an environment in which the rotating electric machine is installed.

What is claimed is:

1. A method of operating a rotating electric machine, the method comprising:
providing the rotating electric machine, the rotating electric machine comprising:
a rotating electric machine main body comprising:
a shaft;
a rotor fixed to the shaft;
a stator including a stator core and a stator coil, the stator surrounding an outer circumferential surface of the rotor; and
a housing surrounding the stator and the rotor;
an outgoing pipe for guiding the coolant from a pump to the rotating electric machine main body; and
a return pipe for guiding the coolant from the rotating electric machine main body to the pump,
the outgoing pipe and the return pipe being connected between the rotating electric machine main body and the pump, wherein:
the housing includes a first coolant inflow port and a second coolant inflow port for guiding a coolant into the housing and a coolant exhaust port for exhausting the coolant in the housing to outside the housing;
the shaft includes a shaft internal flow path having an end surface opposed to the first coolant inflow port, for guiding the coolant into the shaft;
the rotor includes a rotor internal flow path being in communication with the shaft internal flow path and passing through the rotor in an axial direction of the rotor, for guiding the coolant flowing out of the shaft internal flow path to outside of the rotor;
the coolant flowing into the first coolant inflow port passes through the shaft internal flow path and the rotor internal flow path and then flows out of the housing through the coolant exhaust port;
the coolant flowing into the second coolant inflow port passes through a clearance between the housing and the stator and around coil ends of the stator coil and then flows out of the housing through the coolant exhaust port;
the outgoing pipe includes a pipe main body having one end portion connected to the pump and another end portion to which a valve is mounted, and a first outgoing pipe portion and a second outgoing pipe portion which are connected to the pipe main body through the valve and branch from the pipe main body;
the first outgoing pipe portion has a distal end portion connected to the first coolant inflow port;
the second outgoing pipe portion has a distal end portion connected to the second coolant inflow port;
the rotating electric machine main body comprises an electric motor main body to be mounted in an automobile; and
the coolant comprises an automatic transmission fluid,
the method of operating the rotating electric machine comprising:
selecting at least one of physical quantities of internal states of the electric motor main body, including a temperature of the stator and the rotor, a number of revolutions of the rotor, and an output torque of the electric motor main body; and
changing flow-rate allocations for an amount of automatic transmission fluid flowing to the rotor side and an amount of automatic transmission fluid flowing to the stator side based on the selected at least one physical quantity.

2. A method of operating a rotating electric machine according to claim 1, wherein, when the number of revolutions of the rotor of the electric motor main body is low, the amount of automatic transmission fluid flowing into the first coolant inflow port is reduced and the amount of automatic transmission fluid flowing into the second coolant inflow port is increased by actuation of the valve.

3. A method of operating a rotating electric machine according to claim 1, wherein, when the number of revolutions of the rotor of the electric motor main body is high, the amount of automatic transmission fluid flowing into the first coolant inflow port is increased and the amount of automatic transmission fluid flowing into the second coolant inflow port is reduced by actuation of the valve.

4. A method of operating a rotating electric machine according to claim 1, wherein, when an allowable upper limit temperature of the rotor is X, a detected temperature of the rotor is X1, an allowable upper limit temperature of the stator is Y, and a detected temperature of the stator is Y1, a value of X1/X and a value of Y1/Y are compared so that the amount of automatic transmission fluid flowing to any one of the rotor and the stator, which has the larger value, is increased and the amount of automatic transmission fluid flowing to another of the rotor and the stator, which has the smaller value, is reduced.

5. A method of operating a rotating electric machine according to claim 1, wherein, during an operation in which the output torque exceeds a continuous rating torque of the electric motor main body, the amount of automatic transmission fluid flowing into the first coolant inflow port is reduced and the amount of automatic transmission fluid flowing into the second coolant inflow port is increased by actuation of the valve.

6. A method of operating a rotating electric machine according to claim 1, wherein, when the number of revolutions of the rotor of the electric motor main body is high and a no-load rotation operation is performed, the pump is stopped.

7. A method of operating a rotating electric machine according to claim 1, wherein, when the number of revolutions of the rotor of the electric motor main body is high and a no-load rotation operation is performed, the pump is stopped and the valve is closed.

8. A method of operating a rotating electric machine, the method comprising:
providing the rotating electric machine, the rotating electric machine comprising:
a rotating electric machine main body comprising:
a shaft;
a rotor fixed to the shaft;
a stator including a stator core and a stator coil, the stator surrounding an outer circumferential surface of the rotor; and
a housing surrounding the stator and the rotor;
an outgoing pipe for guiding the coolant from a pump to the rotating electric machine main body; and
a return pipe for guiding the coolant from the rotating electric machine main body to the pump,
the outgoing pipe and the return pipe being connected between the rotating electric machine main body and the pump, wherein:
the housing includes a first coolant inflow port and a second coolant inflow port for guiding a coolant into the housing and a coolant exhaust port for exhausting the coolant in the housing to outside the housing;
the shaft includes a shaft internal flow path having an end surface opposed to the first coolant inflow port, for guiding the coolant into the shaft;
the rotor includes a rotor internal flow path being in communication with the shaft internal flow path and passing through the rotor in an axial direction of the rotor, for guiding the coolant flowing out of the shaft internal flow path to outside of the rotor;
the coolant flowing into the first coolant inflow port passes through the shaft internal flow path and the rotor internal flow path and then flows out of the housing through the coolant exhaust port;
the coolant flowing into the second coolant inflow port passes through a clearance between the housing and the stator and around coil ends of the stator coil and then flows out of the housing through the coolant exhaust port;
the outgoing pipe includes:
a first outgoing pipe portion having a middle portion to which a valve is mounted, one end portion connected to the pump, and another end portion connected to the first coolant inflow portion;
a second outgoing pipe portion having a middle portion to which a valve is mounted, one end portion connected to the pump, and another end portion connected to the second coolant inflow port, the rotating electric machine main body comprises an electric motor main body to be mounted in an automobile; and
the coolant comprises an automatic transmission fluid,
the method of operating the rotating electric machine comprising:
selecting at least one of physical quantities of internal states of the electric motor main body, including a temperature of the stator and the rotor, a number of revolutions of the rotor, and an output torque of the electric motor main body; and
changing flow-rate allocations for an amount of automatic transmission fluid flowing to the rotor side and an amount of automatic transmission fluid flowing to the stator side based on the selected at least one physical quantity.

9. A method of operating a rotating electric machine according to claim 8, wherein, when the number of revolutions of the rotor of the electric motor main body is low, the amount of automatic transmission fluid flowing into the first coolant inflow port is reduced and the amount of automatic transmission fluid flowing into the second coolant inflow port is increased by actuation of the valve.

10. A method of operating a rotating electric machine according to claim 8, wherein, when the number of revolutions of the rotor of the electric motor main body is high, the amount of automatic transmission fluid flowing into the first coolant inflow port is increased and the amount of automatic transmission fluid flowing into the second coolant inflow port is reduced by actuation of the valve.

11. A method of operating a rotating electric machine according to claim 8, wherein, when an allowable upper limit temperature of the rotor is X, a detected temperature of the rotor is X1, an allowable upper limit temperature of the stator is Y, and a detected temperature of the stator is Y1, a value of X1/X and a value of Y1/Y are compared so that the amount of automatic transmission fluid flowing to any one of the rotor and the stator, which has the larger value, is increased and the amount of automatic transmission fluid flowing to another of the rotor and the stator, which has the smaller value, is reduced.

12. A method of operating a rotating electric machine according to claim 8, wherein, during an operation in which the output torque exceeds a continuous rating torque of the electric motor main body, the amount of automatic transmission fluid flowing into the first coolant inflow port is reduced and the amount of automatic transmission fluid flowing into the second coolant inflow port is increased by actuation of the valve.

13. A method of operating a rotating electric machine according to claim 8, wherein, when the number of revolutions of the rotor of the electric motor main body is high and a no-load rotation operation is performed, the pump is stopped.

14. A method of operating a rotating electric machine according to claim 8, wherein, when the number of revolutions of the rotor of the electric motor main body is high and a no-load rotation operation is performed, the pump is stopped and the valve is closed.

* * * * *